(12) United States Patent
Gerdes

(10) Patent No.: US 6,481,281 B1
(45) Date of Patent: Nov. 19, 2002

(54) WHEEL MOUNT CHUCK AND WHEEL MOUNT METHOD FOR VEHICLE WHEEL BALANCERS

(75) Inventor: Michael D. Gerdes, St. Peters, MO (US)

(73) Assignee: Hunter Engineering Company, Bridgeton, MO (US)

( * ) Notice: Subject to any disclaimer, the term of this patent is extended or adjusted under 35 U.S.C. 154(b) by 279 days.

(21) Appl. No.: 09/611,381

(22) Filed: Jul. 7, 2000

(51) Int. Cl.[7] .............................. G01M 1/16; B25G 3/22
(52) U.S. Cl. .............................. 73/460; 73/480; 73/487; 279/131
(58) Field of Search ................ 73/460, 66, 478, 73/480, 482, 487; 279/121, 123, 131

(56) References Cited

U.S. PATENT DOCUMENTS

| | | | |
|---|---|---|---|
| 3,667,299 A | * 6/1972 | Roberts | 73/487 |
| 3,704,022 A | 11/1972 | Blattry et al. | 279/121 |
| 3,841,647 A | 10/1974 | Cooper | 279/110 |
| 3,916,696 A | * 11/1975 | Mitchell | 73/484 |
| 3,919,889 A | * 11/1975 | Mitchell | 73/485 |
| 3,995,498 A | * 12/1976 | Curchod et al. | 73/480 |
| 4,168,627 A | 9/1979 | Held et al. | 73/487 |
| 4,352,291 A | * 10/1982 | Curchod et al. | 73/462 |
| 4,423,633 A | 1/1984 | Coetsier | 73/487 |
| 4,462,253 A | * 7/1984 | Becher | 73/487 |
| 4,640,518 A | 2/1987 | Ferraro | 279/123 |
| 5,224,303 A | 7/1993 | Baldwin | 451/365 |
| 5,292,139 A | * 3/1994 | Gaillard | 279/123 |
| 5,665,911 A | * 9/1997 | Warkotsch | 73/487 |
| 6,101,875 A | * 8/2000 | Kelm-Klager | 73/462 |

FOREIGN PATENT DOCUMENTS

GB 2324769 * 11/1998

OTHER PUBLICATIONS

Coats® Accessories/Wheel Balancer & Tire Changer (5 catalogue pages).
Handbetrieben mit elektronischem Speicher–balco 90 (1 catalogue page in German).
Handbetrieben mit elektronischem Speicher fur 13" bis 26" Felgen (1 catalogue page in German).
Haweka Duo Expert Adaptor (3 catalogue pages from the Haweka web site).

* cited by examiner

Primary Examiner—Hezron Williams
Assistant Examiner—Jacques Saint-Surin
(74) Attorney, Agent, or Firm—Polster, Lieder, Woodruff & Lucchesi L.C.

(57) ABSTRACT

A multi-jawed chuck adapter (100) is secured substantially coaxially within a pilot hole (20) of a wheel and tire assembly (10) to facilitate mounting of the wheel and tire assembly (10) upon the spindle shaft (12) of a vehicle wheel balancer, eliminating sources of error introduced into balancing operations by improper mounting of the wheel and tire assembly thereon.

12 Claims, 11 Drawing Sheets

WHEEL MOUNT CHUCK AND WHEEL MOUNT METHOD FOR VEHICLE WHEEL BALANCERS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to an adapter and method for mounting vehicle wheels to the spindle shaft of a vehicle wheel balancer, and more particularly, to a multi-jawed chuck adapter configured to seat about the spindle of a vehicle wheel balancer and to facilitate the mounting of vehicle wheels thereon with a reduction in the number of error sources.

Traditionally, as seen in prior art FIGS. 1 and 2, an automotive vehicle wheel assembly 10, with or without a tire secured to the wheel, is mounted onto the spindle 12 or rotatable shaft of a wheel balancing machine (not shown) by centering the wheel and tire assembly 10 on a cone 14 fitted around the spindle 12, and clamping the wheel and tire assembly 10 in place by means of a pressure ring 15 and wing nut 16 or similar retainer. Such a system is described in U.S. Pat. No. 4,168,627 to Held et al., and may include a spring (not shown) exerting a force on a spring bias plate 18 contained within a hub 19 to further aid in seating the cone 14 into the wheel and tire assembly 10.

It has been found that the traditional cone 14 and wing nut 16 mounting systems do not work well with large wheel and tire assemblies 10, such as those from pickup trucks, recreational vehicles, or commercial trucks which are heavy, and include an offset wheel rim. When mounting wheel and tire assemblies 10 from such vehicles, typically it is difficult to properly seat the wheel and tire assembly on the cone 14 such that the wheel and tire assembly is centered properly. An improper centering of the wheel and tire combination 10 can induce errors during the balancing operation.

Difficulties in mounting the large wheel and tire assemblies 10 to the traditional cone 14 arise from the fact that the center of gravity of the wheel and tire assembly 10 typically lies in a vertical plane which differs substantially from the vertical plane defined by the rim mounting surface containing the wheel pilot hole into which the cone 14 seats. The heavy weight of the wheel and tire assembly 10 and the substantial offset between the wheel pilot hole and the center of gravity of the wheel and tire assembly 10 causes the wheel and tire assembly 10 to twist as it is mounted to the cone 14, and prevents proper placement on the cone 14, resulting in the wheel and tire assembly 10 being mounted in an eccentric or non-concentric position to the wheel balancer spindle 12. It has been found that this eccentricity can be marginally improved if the wheel and tire assembly 10 is manually lifted in an upward direction while the wing nut 16 is tightened, thereby permitting the axial forces exerted by the wing nut 16 to shift the position of the wheel and tire assembly 10 on the cone 14. However, such wheel and tire assemblies 10 are heavy.

An additional source of error introduced to the wheel balancer system by the traditional cone 14 and wing nut 16 clamping method is the contact surface between the wheel 10 and cone 14. While the axial pilot hole 20 of a vehicle wheel is generally coaxial with the wheel axis of rotation, the wheel pilot hole 20 often includes a chamfered edge, ground in during the manufacture process to break the sharp corner of the pilot hole 20. This chamfer is not ground to any specific dimension or tolerance, and therefore cannot be assumed to be concentric with the wheel axis of rotation passing through the pilot hole 20. When the wheel and tire assembly 10 is placed onto the cone 14 of a traditional balancer mounting system, the surface of the cone 14 contacts the surface of the chamfer, not the pilot hole 20 edge. Therefore, any runout or eccentricity in the chamfer results in an eccentric mounting of the wheel and tire combination 10 to the balancer spindle 12 which can adversely affect balancing operations.

Several variations on the traditional cone mounting system have been employed to improve the accuracy of mounting wheel and tire assemblies to the balancer spindle 12. Cones 14 having narrow taper angles such as 10° to 20° have been found to improve the mounting of large wheel and tire assemblies 10 over cones 14 having larger taper angles such as 45° to 60°. However, a larger number of narrow taper angle cones is required to correspond to the wide variation in wheel pilot hole 20 sizes, and the inherent difficulties associated with eccentric mounting of the wheel and tire assembly 10 remain.

As seen in FIG. 2, an additional variation includes the use of a flange plate adapter 22 M with the cone 14 mounted on the balancer spindle. The flange plate adapters 22 are illustrated in U.S. Pat. No. 4,423,633 to Coetsier. Flange plates adapters 22 commonly include rigid pins 24 with conical ends 26 for positioning within the lug nut openings 28 of a wheel to improve centering of the vehicle wheel about the balancer spindle axis 12. While the use of flange plate adapters 22 may provide some improvement in reducing eccentric mounting of the vehicle wheel and tire assembly 10, several problems remain. First, the vehicle wheel must still be lifted into place prior to securing the flange plate adapter 22. This is a difficult operation. The addition of the flange plate adapter 22 about the spindle axis 12 introduces an additional source of error, as the flange plate adapter 22 and the cone 14 may not be concentric with respect to each other. As with the chamfered edge of the wheel pilot hole 22, the lug nut holes 28 of a vehicle wheel are often chamfered as well, leading to a source of error when the flange plate pins 24 are seated therein. Furthermore, the chamfers of the lug nut openings 28 are not always concentric with the lug nut openings. Under these conditions, the flange plate adapter 22 itself can be forced to deform as the wing nut 16 is tightened to retain the wheel and tire assembly 10 on the balancer spindle 12.

Accordingly, there is a need in the wheel balancer industry for an apparatus and method to facilitate the mounting of large vehicle wheel and tire assemblies 10 onto the spindle shaft 12 of wheel balancer machines.

BRIEF SUMMARY OF THE INVENTION

Among the several objects and advantages of the present invention are:

The provision of a multi-jawed chuck configured to seat within the pilot hole of a vehicle wheel or wheel assembly and to facilitate mounting of the vehicle wheel or wheel assembly to the spindle shaft of a balancer without the use of a mounting cone;

The provision of the aforementioned multi-jawed chuck wherein the chuck has three expandable and retractable jaws for contacting the inner surface of a vehicle wheel pilot hole;

The provision of the aforementioned multi-jawed chuck wherein the chuck is self-centering within the wheel pilot hole;

The provision of the aforementioned multi-jawed chuck wherein the chuck is configured for attachment to the vehicle wheel prior to placement of the vehicle wheel on a wheel balancer spindle shaft;

The provision of the aforementioned multi-jawed chuck wherein mounting errors associated with chamfered edges of the vehicle wheel pilot hole are minimized;

The provision of the aforementioned multi-jawed chuck wherein the chuck is self-centering within a wide range of vehicle wheel pilot holes;

The provision of the aforementioned multi-jawed chuck wherein use of the multi-jawed chuck provides for a high degree of repeatability in vehicle wheel balancing operations;

The provision of the aforementioned multi-jawed chuck wherein use of the multi-jawed chuck eliminates the need to lift the vehicle wheel while tightening the wing nut to retain the vehicle wheel upon the balancer spindle shaft; and The provision of the aforementioned multi-jawed chuck wherein accuracy of wheel balancing operations is improved.

Briefly stated, the multi-jawed chuck of the present invention comprises a cylindrical body having a central bore, sized to fit with close tolerances about the spindle of a wheel balancer machine. The multi-jawed chuck includes a number of jaws located on one face, configured to expand and contract radially outward from the axis of the central bore. Each jaw includes at least one flange for contacting the inner surface of a wheel pilot hole.

During use, a wheel and tire assembly to be balanced is typically placed horizontally on a floor or other suitable surface such that the wheel pilot hole is accessible for installation of the multi-jawed chuck. The multi-jawed chuck is positioned such that the jaws pass through the wheel pilot hole. Once positioned, the jaws of the multi-jawed chuck are simultaneously moved radially outward to forcefully engage the inner surface of the wheel pilot hole, centering and holding the chuck therein. With the multi-jawed chuck firmly secured in the pilot hole of the wheel, the wheel and tire assembly is lifted and placed on the spindle shaft of the wheel balancer machine by fitting the axial bore of the multi-jawed chuck onto the spindle shaft. Once the wheel and tire assembly is seated on the spindle shaft by means of the multi-jawed chuck, a traditional wing nut is threaded on to the exposed end of the balancer spindle shaft and tightened against the exposed face of the wheel, thereby securing the wheel and tire assembly for balancing operations be seating the back face of the chuck against the hub. Another way to use the chuck is to place a spacer against the hub first, and install the multi-jawed chuck on the convex side of the vehicle wheel.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 7 is a perspective view of the spindle shaft of a wheel balancer configured to receive the wheel and tire assembly shown in FIGS. 5a and 6a;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The term "substantially" as used herein is understood to mean "within a predetermined amount or tolerance". The term "wheel assembly" as used herein is understood to refer generally to a vehicle wheel rim, with or without a tire secured thereon, and is synonymous with the term "wheel and tire assembly".

Figure 1:
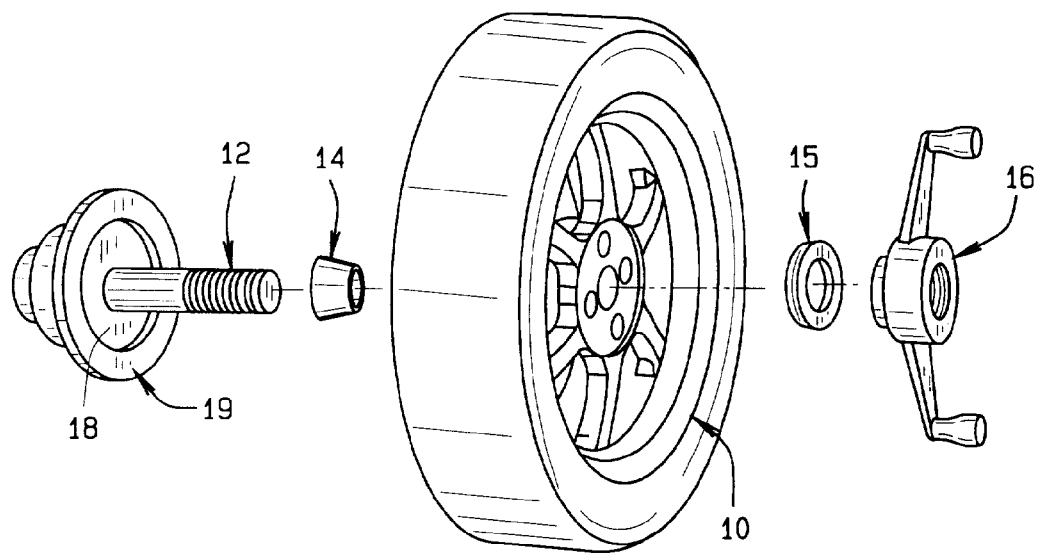
FIG. 1 is an exploded view of a balancer spindle shaft, a prior art mounting cone, wheel and tire assembly, and clamping wing nut.
Figure 2:
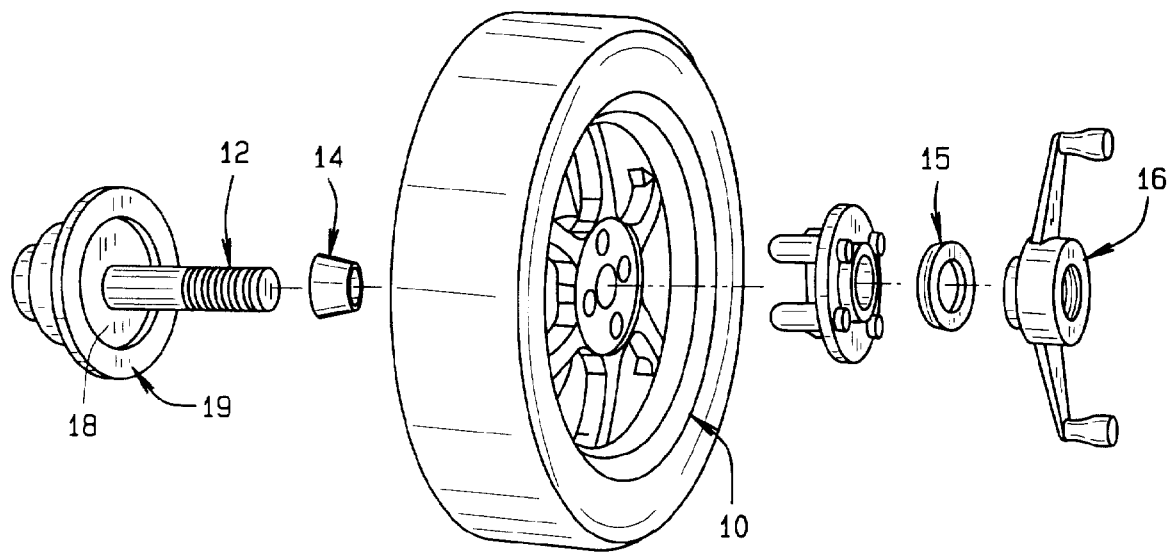
FIG. 2 is an exploded view of a balancer spindle shaft, a prior art mounting cone, a wheel and tire assembly, a prior art flange plate, and a clamping wing nut.
Figure 3:
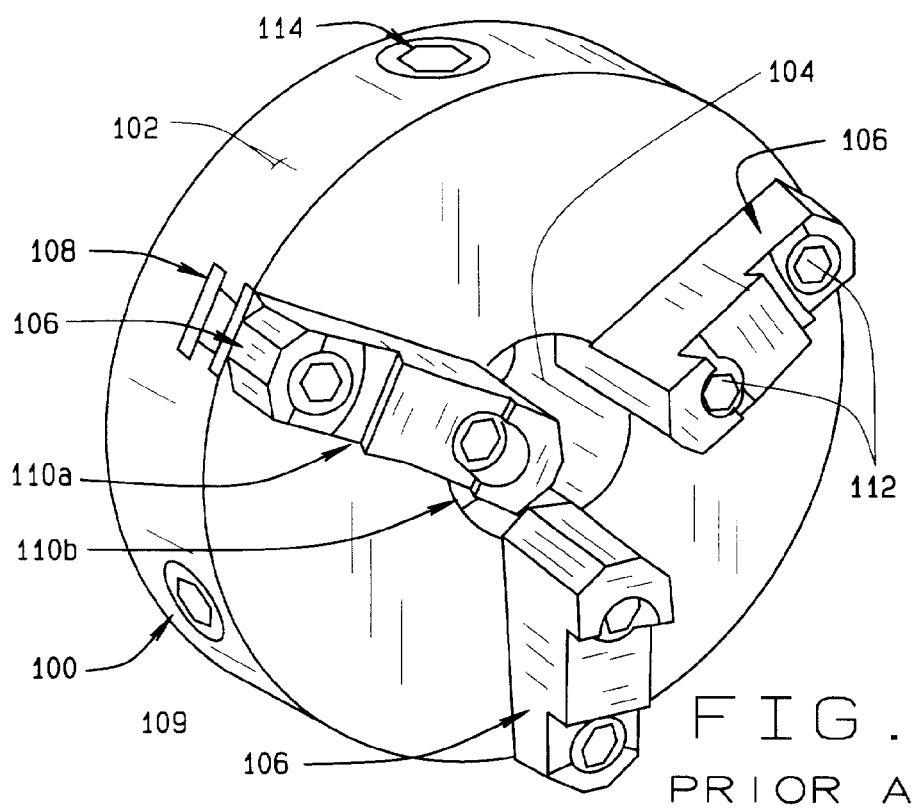
FIG. 3 is a perspective illustration of a prior art self-centering three-jaw scroll chuck.
Figure 4:
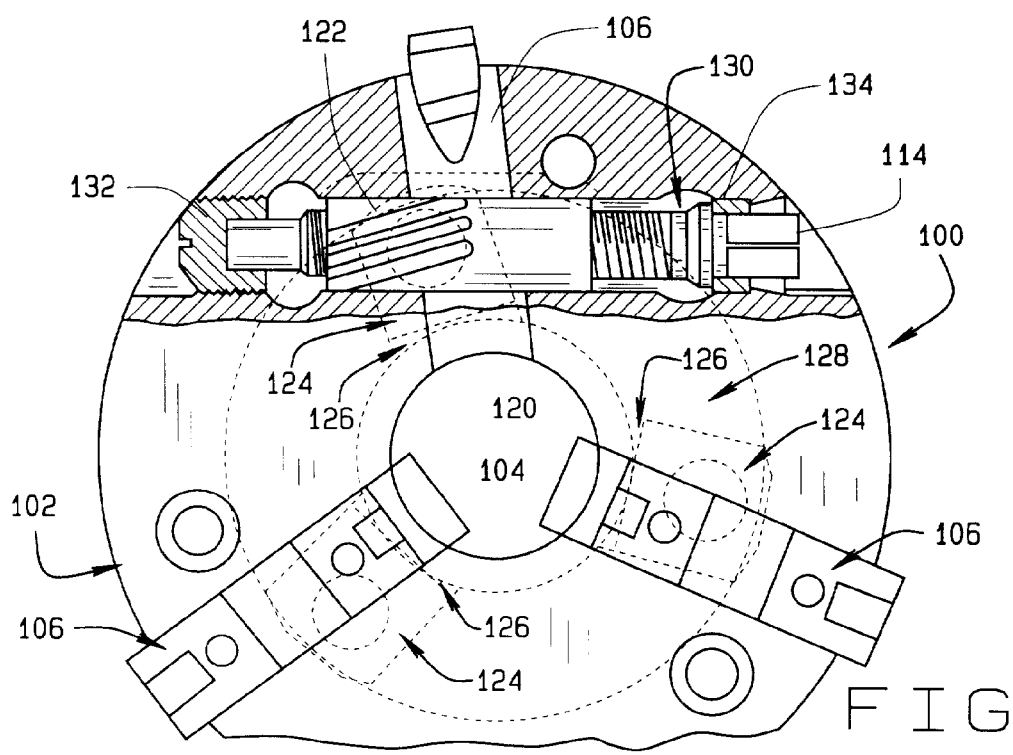
FIG. 4 is a sectional view of a prior art three-jaw chuck of a design different from that of a scroll chuck.

Turning to FIGS. 3 and 4, a multi-jawed chuck suitable for coaxial mounting of a wheel assembly 10 onto the spindle shaft 12 is shown generally at 100. The multi-jawed chuck comprises a cylindrical chuck body 102 having an axial bore 104 sized to fit about the spindle shaft 12 of the wheel balancer to a close tolerance. A plurality of jaws 106 are radially displaceably guided in radial slots 108 on a front face 109 of the chuck body 102. In the preferred embodiment, three equidistantly spaced jaws 106 are utilized, however, those of ordinary skill in the art will readily recognize that the number of radially movable jaws 106 may be varied from two to as many as can be fit on the face 109 of the chuck body 102 within the scope of this invention. Each of the jaws 106 extends axially above the face of the chuck body 102, and includes a number of stair-step raised shoulders 110A and 110B. The stair-step raised shoulders 110A and 110B may either be formed integral with the body of the jaw 106, or may be removably attached thereto by means of threaded retaining bolts 112 or the other suitable fasteners. The specific size each raised shoulder 110A and 110B, as well as the set-back distance between each shoulder 110A and 110B is selected to correspond to a range of pilot hole 20 sizes and diameters for a variety of wheel and tire assemblies 10.

The multi-jawed chuck 100 may be of the self-centering scroll chuck variety wherein each jaw moves simultaneously, such as is described in U.S. Pat. No. 4,640,518 to Ferraro, which includes a wrench-engageable actuating means or drive 114. The drive 114 is threadably engaged with the teeth of a worm gear (not shown) which in turn is threadably engaged with worm teeth 115 on the underside of each of the jaws 106. Actuation of the drive 114 turns the worm gear to cause the jaws 106 to simultaneously slide radially outward or inward along the radial slots 108.

An alternative prior art embodiment of the multi-jawed chuck 100, as illustrated in the sectional view of FIG. 4 and as described in U.S. Pat. No. 3,704,022 to Blattry et al. displaceably guides a wedge block 120 in a tangential groove of the chuck body 102 beneath each of the jaws 106 in a direction transverse to the associated jaw 106. Each of the wedge blocks has a portion of a surface which faces the associated jaw 106 and includes inclined teeth 122 which fit into tooth spaces on the underside of the associated jaw 106. Each wedge block 120 has its back side provided with a cylindrical boss which is parallel to the axis of the central bore 104. Journalled on the boss is a slide block 124 which is guided in a radial groove 126 of a transmission ring 128 rotatably and coaxially journalled in the chuck body 102.

The wedge block 120 is driven directly by an operating screw or threaded spindle 130 which by means of a thrust plug 132 and a thrust ring 134 is journalled in the chuck body 102. By turning the threaded spindle 130 by means of the actuating means 114, the wedge block 120 is displaced in its tangential groove, taking along the transmission ring 128 which takes along each slide block 124 associated with the remaining jaws 106, thereby radially displacing the jaws 106 inward and outward depending upon the direction of rotation of the actuating means 114.

Figure 5A:
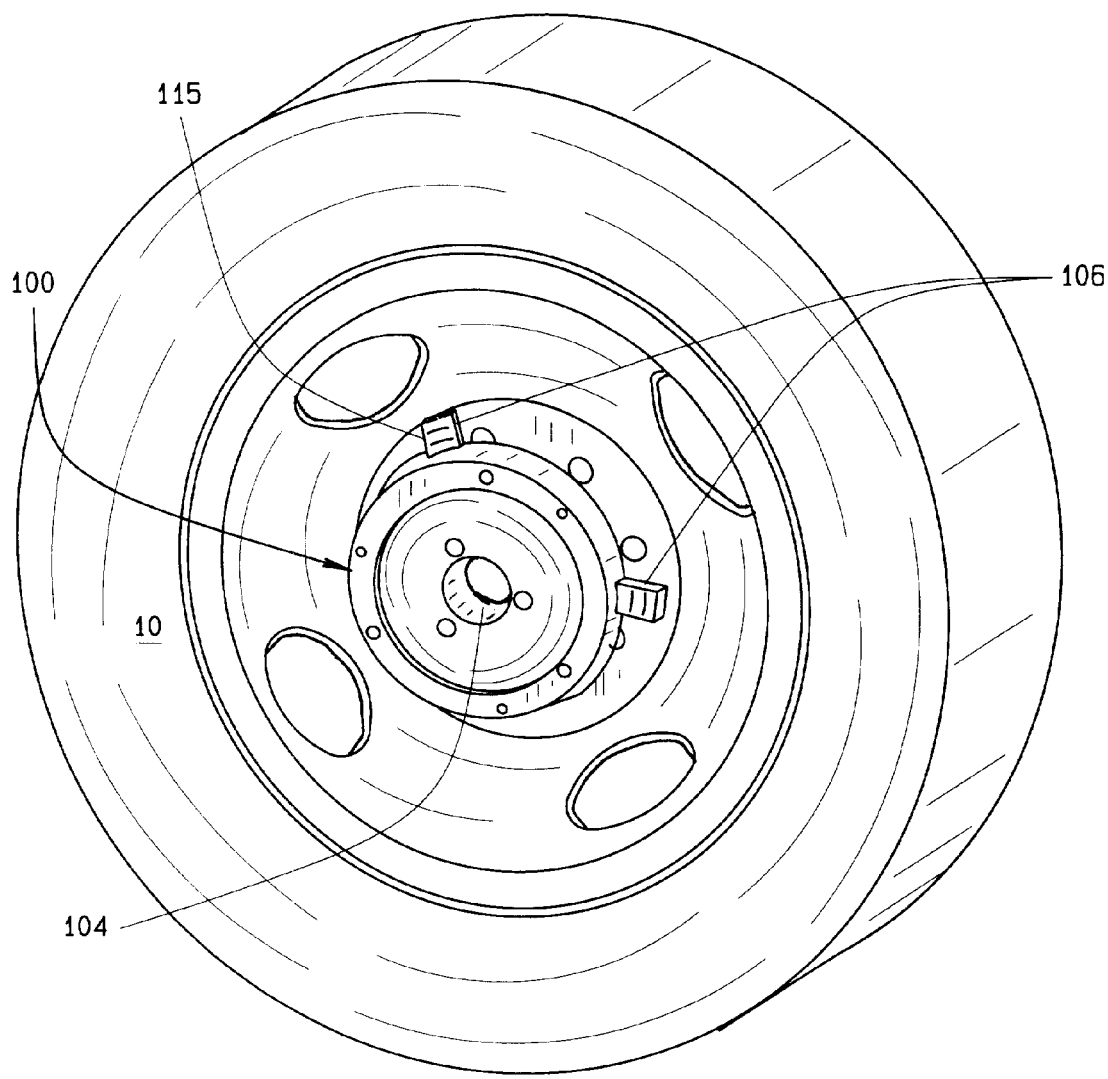
FIG. 5a is a perspective view of a wheel and tire assembly seen from the rear, with a multi-jawed chuck secured in the concave side of the wheel pilot hole as taught by the method of the present inventions.
Figure 5B:
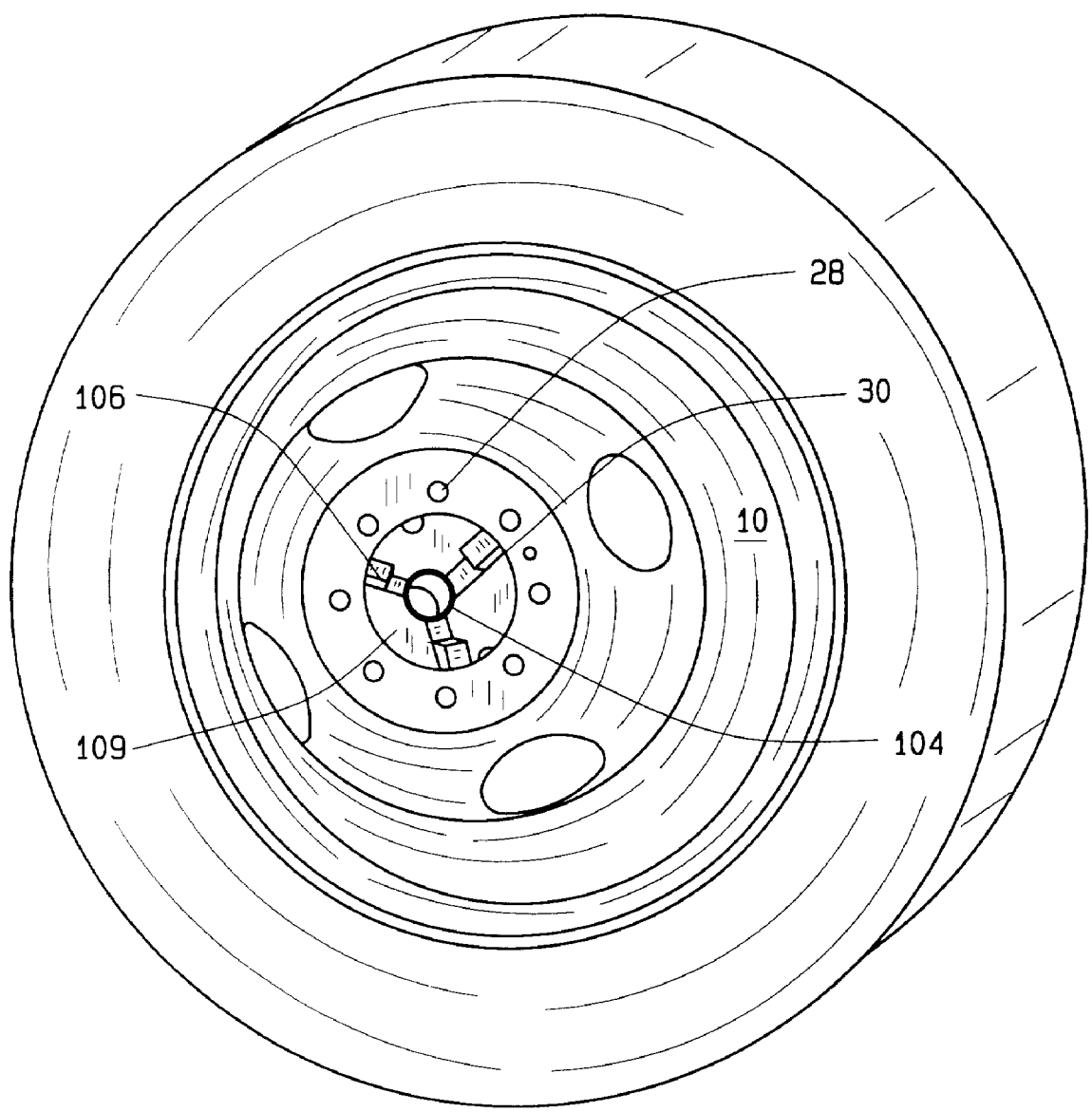
FIG. 5b is a perspective view of a wheel and tire assembly seen from the rear, with a multi-jawed chuck secured in the convex side of the wheel pilot hole as taught by the method of the present inventions.
Figure 6A:
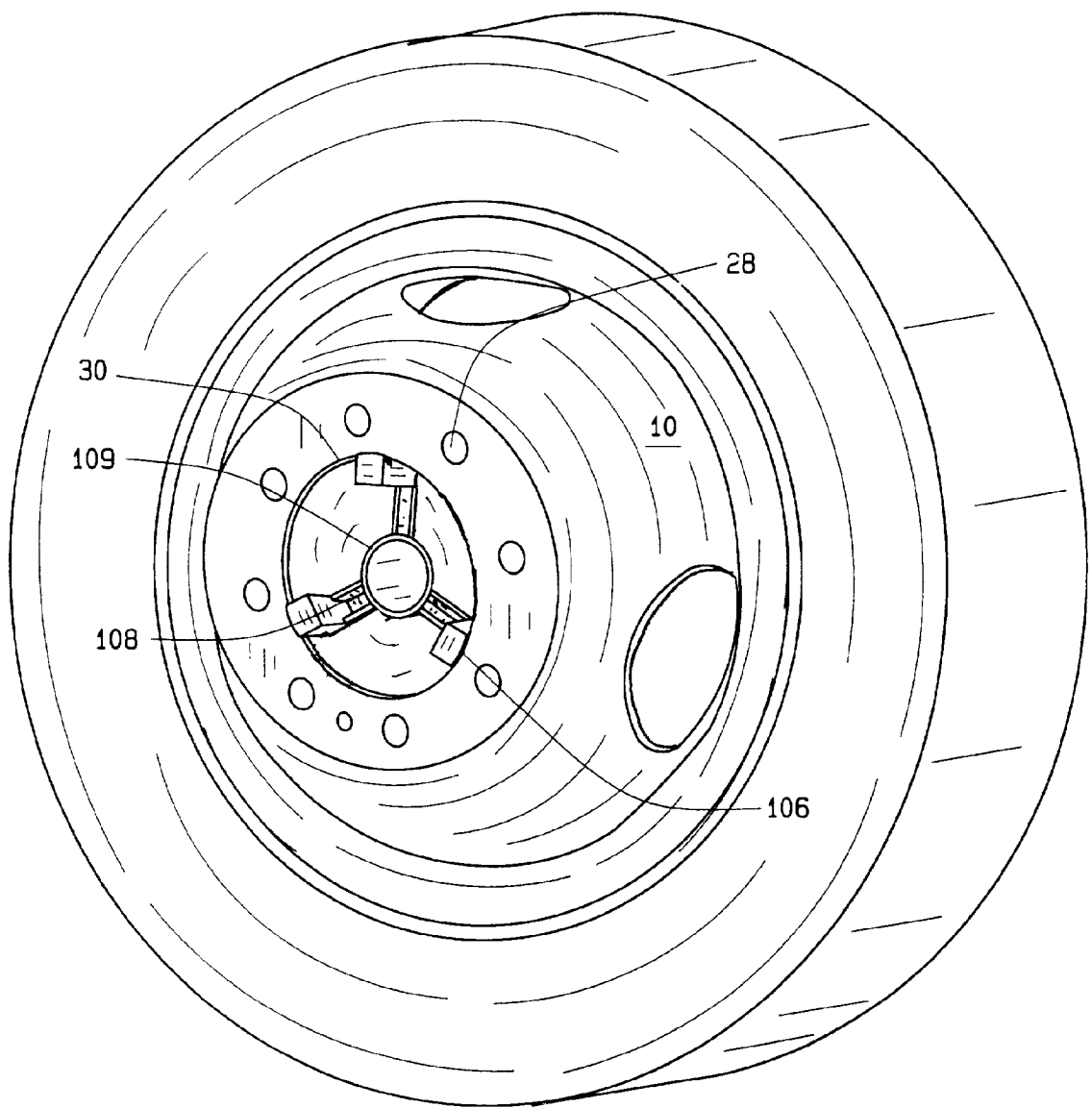
FIG. 6a is a perspective view of the wheel and tire assembly of FIG. 5a, seen from the front, with the multi-jawed chuck secured in the concave side of the wheel pilot hole.
Figure 6B:
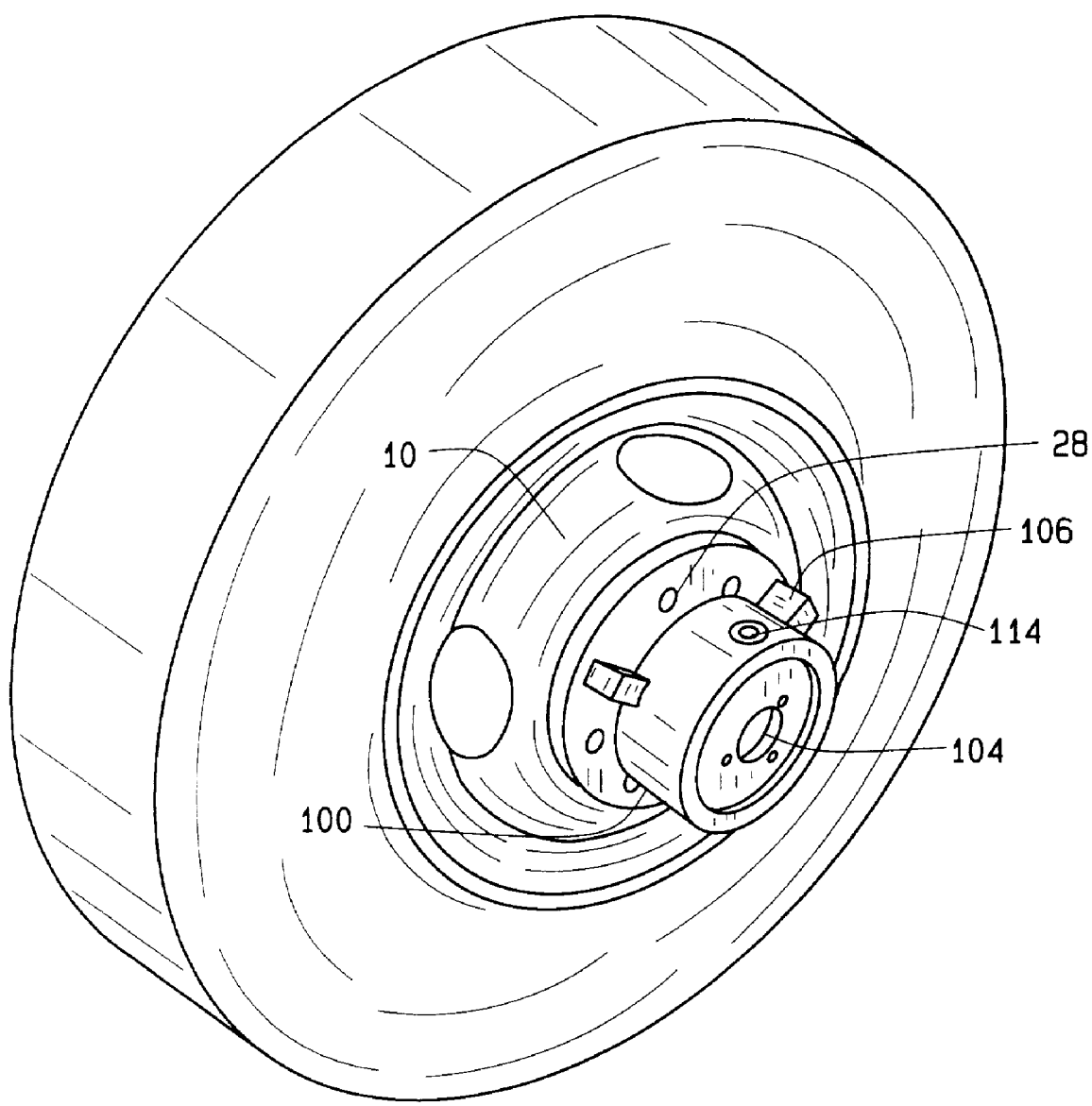
FIG. 6b is a perspective view of the wheel and tire assembly of FIG. 5b, seen from the front, with the multi-jawed chuck secured in the convex side of the wheel pilot hole.

Turning to FIGS. 5a and 6a, the fitting of the multi-jawed chuck 100 to the concave side of the wheel and tire assembly 10 is illustrated. The wheel and tire assembly 10 is placed on a surface, such that the pilot hole 20 of the wheel and tire assembly 10 is accessible from both sides. The multi-jawed chuck 100, with each of the jaws 106 in a retracted position (i.e., moved radially inward clear of pilot hole 20), is placed into the pilot hole 20 such that one of the shoulders 110a, 110b engages the inner surface 30 of the wheel and tire assembly 10 defining the pilot hole 20. The actuating drive 114 on the multi-jawed chuck 100 is rotated so as to displace To or drive each of the jaws 106 radially outward form the center bore 104 of the multi-jawed chuck. As the shoulder 110a, 110b of each jaw 106 contacts the inner surface 30 defining the pilot hole 20, the multi-jawed chuck 100 is shifted such that the axis of the center bore 104 becomes substantially coaxial with the pilot hole 20 upon engagement of each jaw 106 with the inner surface 30. Alternatively, as is illustrated in FIGS. 5b and 6b, the multi-jawed chuck 100 may be installed on the convex side of the wheel and tire assembly 10.

Figure 7:
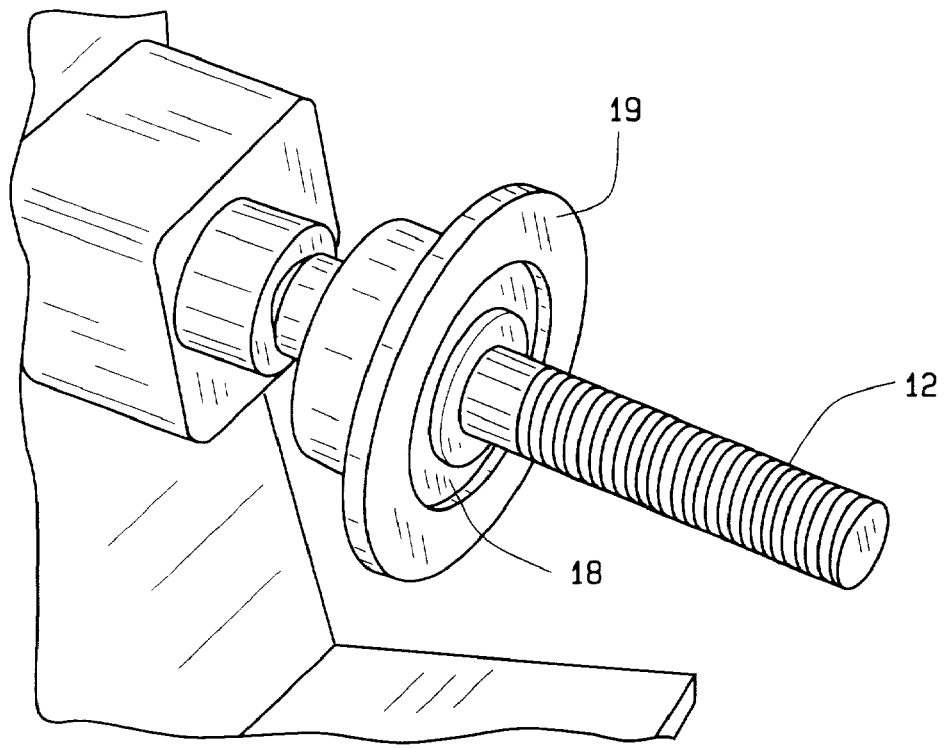
Figure 9A:
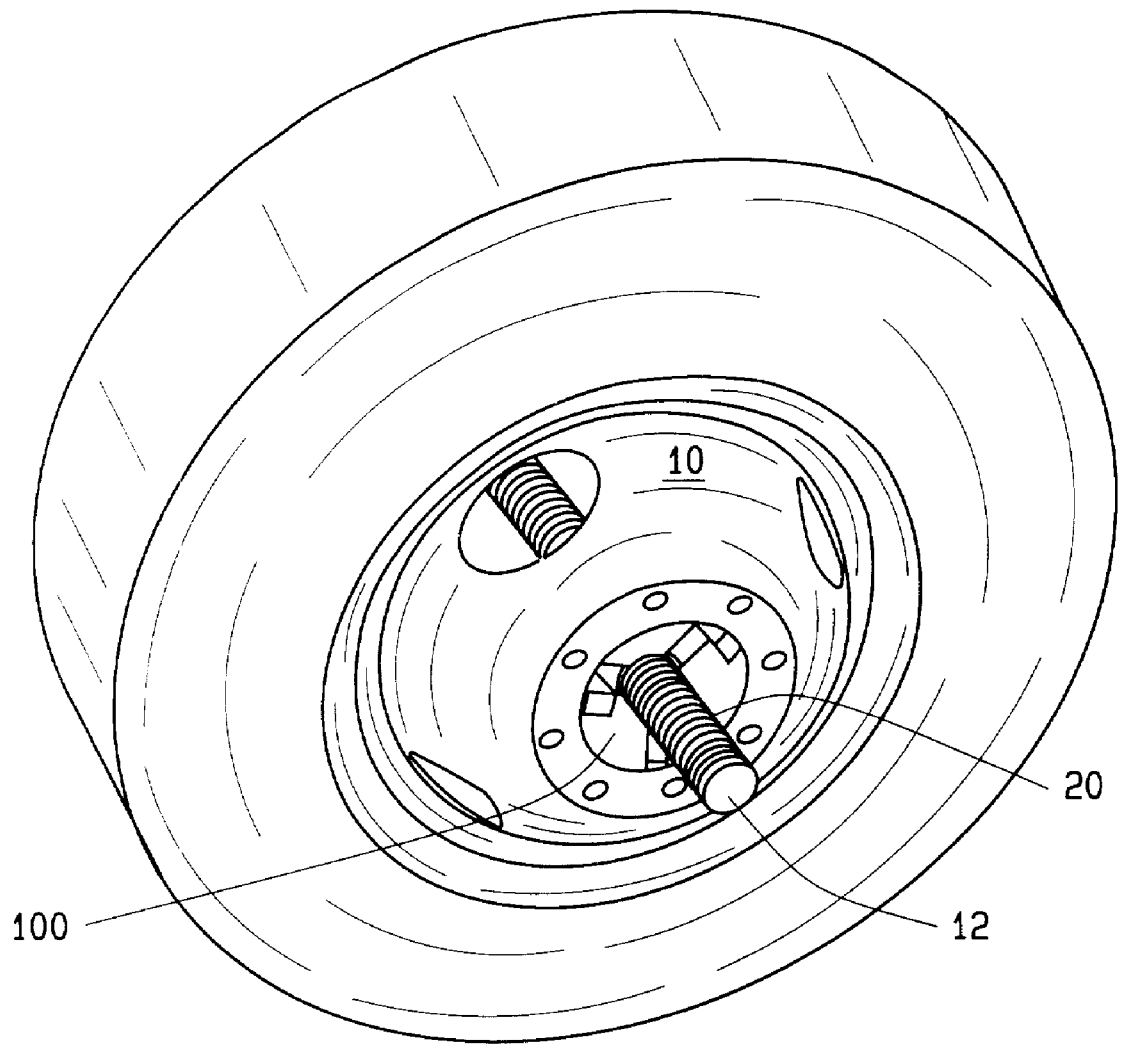
FIG. 9a is a perspective view of the wheel and tire assembly of FIGS. 5a and 6a mounted concentrically on the spindle shaft of a wheel balancer.
Figure 9B:
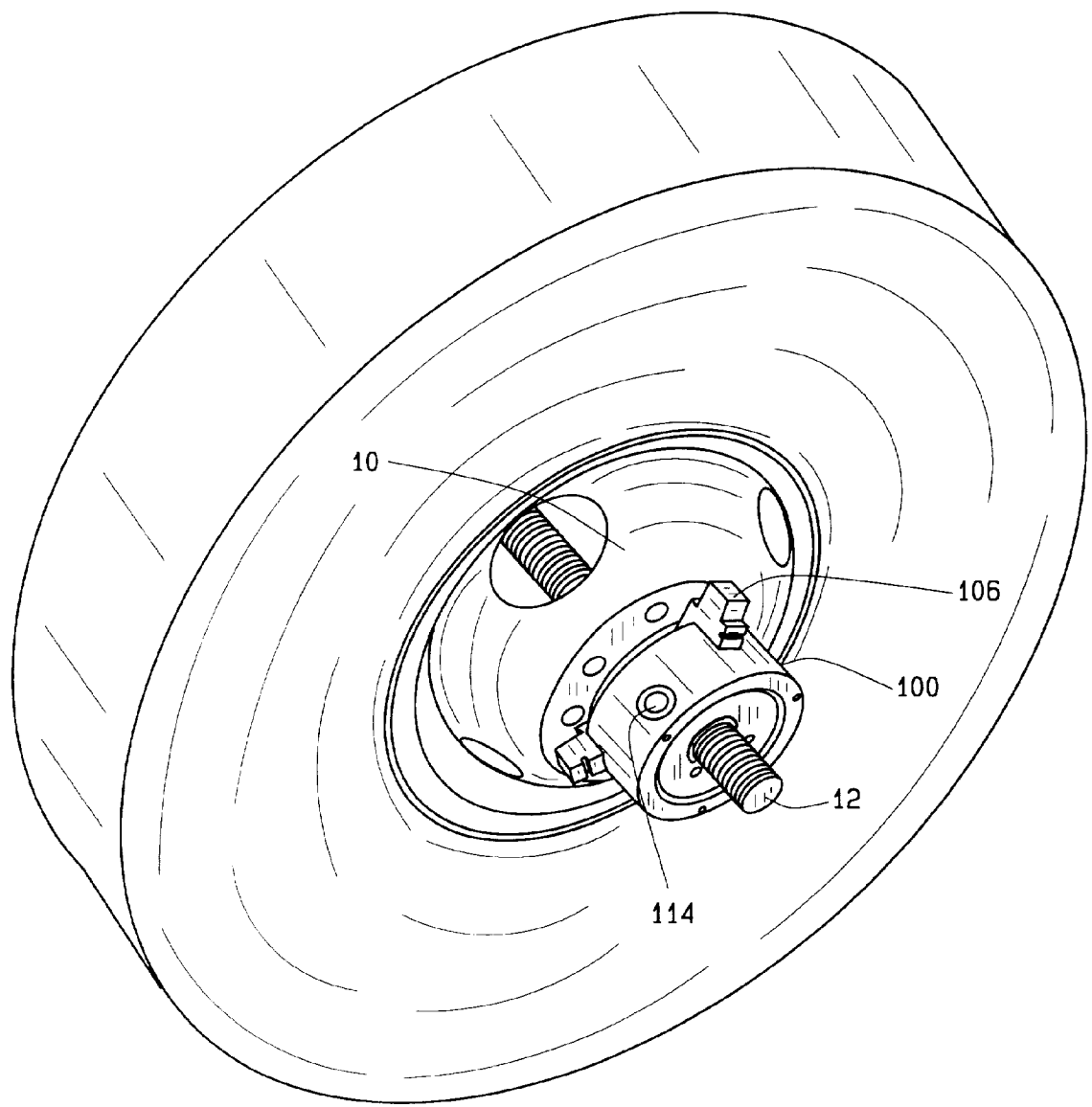
FIG. 9b is a perspective view of the wheel and tire assembly of FIGS. 5b and 6b mounted concentrically on the spindle shaft of a wheel balancer.

As illustrated in FIG. 9a, the combination of the wheel and tire assembly 10 with the multi-jawed chuck 100 installed on the concave side is lifted and placed on the bare spindle shaft 12 of a wheel balancer apparatus (FIG. 7) by sliding the axial bore 104 of the multi-jawed chuck over the spindle shaft 12. In one embodiment, the back face of the chuck body 102 contacts the hub face 19 once placed upon the spindle shaft 12, however, those of ordinary skill in the art will recognize that alternative stops such as a bushing or other contact surface may be employed for the back face of the chuck body 102 to seat against.

Figure 8:
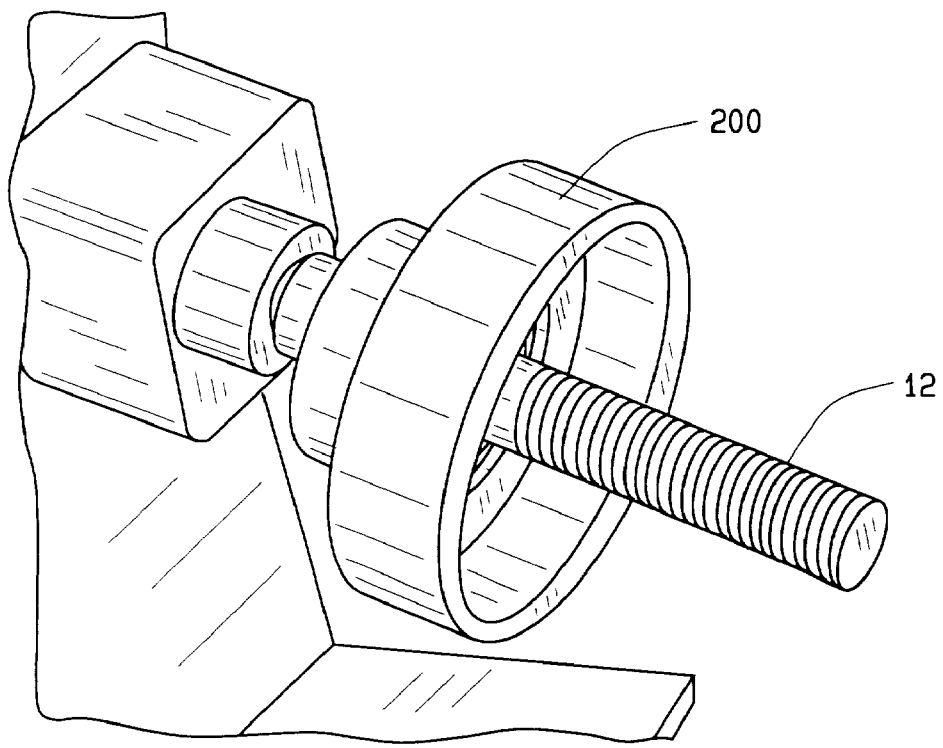
FIG. 8 is a perspective view of the spindle shaft of a wheel balancer configured with a spacer to receive the wheel and tire assembly shown in FIGS. 5b and 6b.

If the multi-jawed chuck 100 is installed on the convex side of the wheel and tire assembly 10, a spacer 200 is installed on the spindle shaft 12 of the wheel balancer apparatus, as illustrated in FIG. 8, prior to placement of the wheel and tire assembly 10 with the multi-jawed chuck 100. The spacer 200 seats between the hub 19 and the concave side of the wheel and tire assembly 10.

Figure 10A:
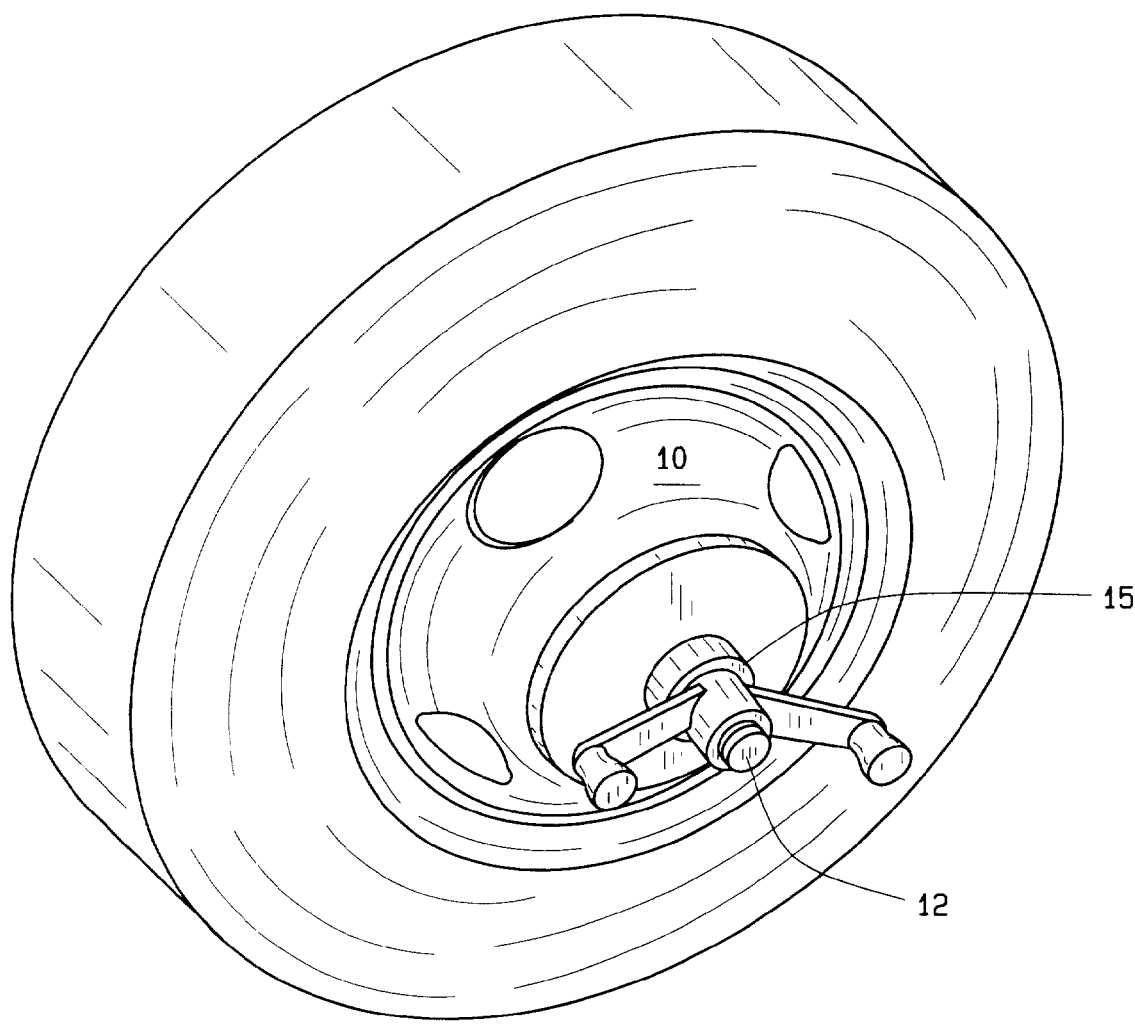
FIG. 10a is a perspective view similar to FIG. 9a of the wheel and tire assembly secured to the spindle shaft of the wheel balancer with a wing nut.
Figure 10B:
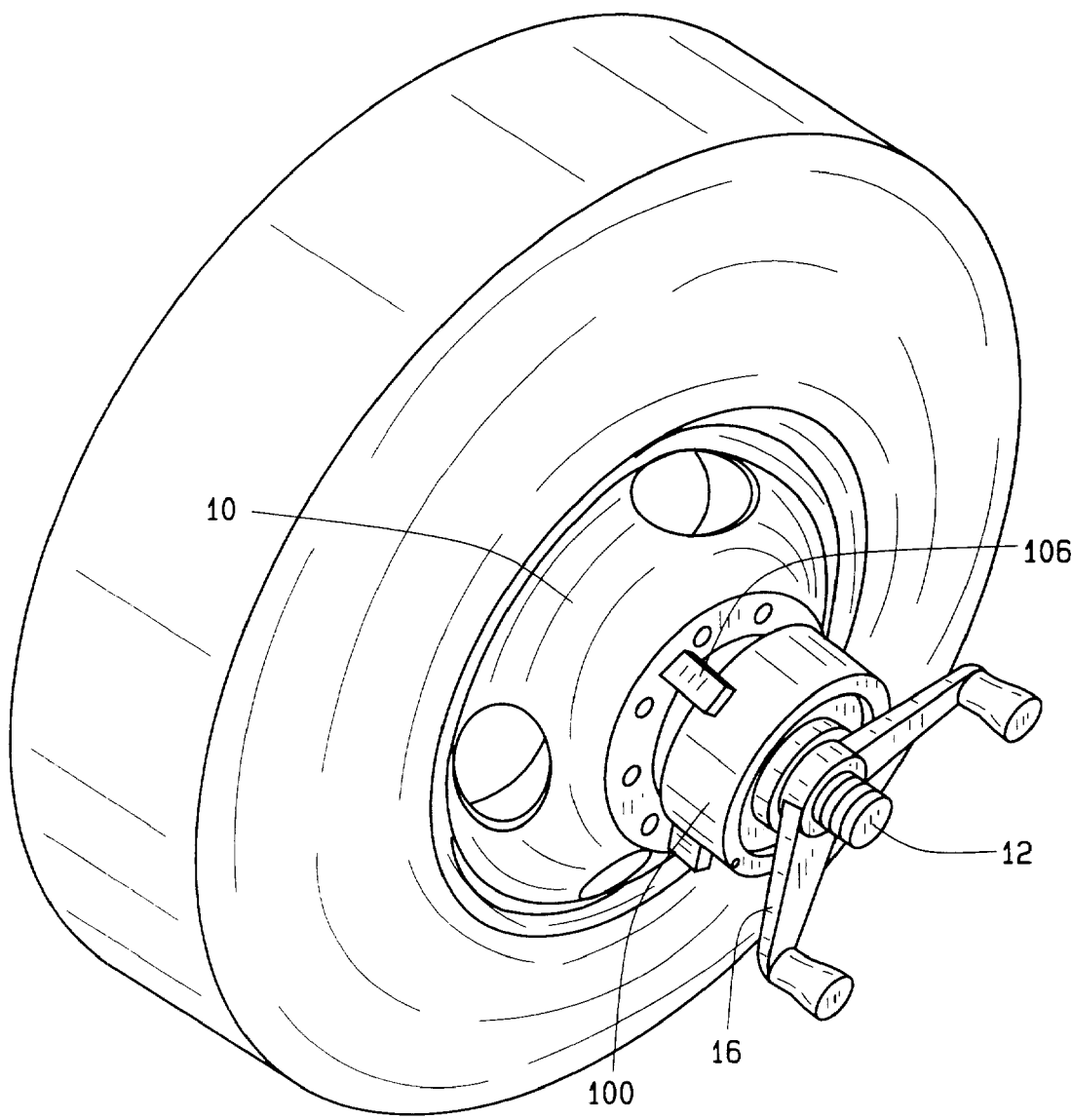
FIG. 10b is a perspective view similar to FIG. 9b of the wheel and tire assembly secured to the spindle shaft of the wheel balancer with a wing nut.

To secure the combination of the wheel and tire assembly 10 and the multi-jawed chuck 100 to the spindle shaft 12 for rotational balancing operations, the pressure ring 15, or other annular plate is fitted onto the spindle 12, contacting the wheel and tire assembly 10. The pressure ring 15, and the combination of the wheel and tire assembly 10 and multi-jawed chuck 100 are secured to the spindle shaft 12 by a traditional wing nut 16 threaded onto the exposed end of the spindle shaft 12 and tightened against the pressure ring 15, thereby clamping the wheel and tire assembly 10, as shown in FIG. 10a. If the chuck is placed on the convex side of the wheel the spacer 200 is typically placed on the spindle shaft 12 adjacent the hub 19 before the wheel/tire/chuck assembly. Then the wing nut 16 is used to clamp all the pieces together as shown in FIG. 10b. Those of ordinary skill in the art will recognize that a wide variety of retainers exist and may be employed to secure the wheel and tire assembly 10 and multi-jawed chuck 100 onto the spindle shaft 12 within the scope of this invention.

Once the wheel and tire assembly is secured to the spindle shaft 12 by means of the wing nut 16, the wheel balancer is operated in a conventional manner to identify and correct any imbalance present in the wheel and tire assembly. Removal of the wheel and tire assembly 10 from the spindle shaft 12 of the balancer is the reverse procedure from installation thereon.

It will be readily apparent to one of ordinary skill in the art that a number of problems associated with the use of traditional cones 14 to secure large truck wheel and tire combinations 10 to the spindle shaft 12 of a balancer have been solved by the apparatus and method of the present invention. For example, by contacting only the inner circumferential surface 30 of the pilot hole 20, the multi-jawed chuck 100 reduces the effect of any eccentricity introduced into the axial placement of the wheel and tire assembly 10 by the misalignment of a pilot hole chamfer. Additionally, mounting of the multi-jawed chuck 100 to the wheel and tire assembly prior to placement of on the spindle shaft 12 eliminates a number of potential sources of misalignment and error, such as improper seating on the cone 14 and deviations from a perpendicular alignment between the radial plane of the wheel and the spindle shaft 12 axis of rotation.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A wheel mount for a wheel/tire balancer having a spindle shaft on which a wheel and tire assembly to be balanced may be mounted, said spindle shaft being rotatably driven by said balancer to effect the balance measurement of said wheel and tire assembly, said wheel and tire assembly having an axis of rotation and comprising a wheel and a tire mounted on said wheel, said wheel having a pilot hole at the center thereof substantially coaxial with the axis of rotation of said wheel and tire assembly, said wheel having one or more edges defining said pilot hole, said wheel mount comprising a chuck having a plurality of jaws operable to grip the inner edge of said wheel defining said pilot hole, so as to fixedly mount said chuck with respect to said wheel, with said chuck substantially centered with respect to said pilot hole and with respect to said axis of rotation of said wheel, said chuck having a center bore substantially coaxial with respect to said axis of rotation when said chuck is mounted on said wheel, said center bore of said chuck receiving said spindle shaft, said spindle shaft having a stop thereon so as to locate said wheel and tire assembly on said spindle shaft when said chuck along with said wheel and tire assembly mounted thereon is received on said spindle shaft, and said balancer further having a retainer securable to said spindle shaft after said chuck along with said wheel and tire assembly mounted thereon is received on said spindle shaft, said retainer being forcibly engageable with at least a portion of said wheel on the side thereof opposite said stop such that said wheel and tire assembly is fixedly held on said spindle shaft as said spindle shaft and said wheel and tire assembly are rotated during balancing.

2. A wheel mount as set forth in claim 1 where in said chuck includes a chuck drive operable in one direction to move said jaws into engagement with said edge of said wheel defining said pilot hole.

3. A wheel mount as set forth in claim 2 wherein said chuck drive being operable another direction to retract said jaws away from said edge of said wheel defining said pilot hole thereby to release said wheel from said chuck jaws.

4. A wheel mount as set forth in claim 1 wherein said spindle shaft is threaded, and wherein said retainer is threaded onto said spindle shaft after said chuck carrying said wheel and tire assembly has been mounted on said balancer shaft such that as said retainer is threadably tightened against said at least a portion of said wheel so as to fixedly mount said wheel and tire assembly on said spindle shaft.

5. A wheel mount as set forth in claim 2 wherein said pilot hole in said wheel may range in diameter between a first diameter and a second diameter, wherein said jaws have a first gripping shoulder generally parallel to the axis of rotation of said wheel and a second gripping shoulder generally parallel to the axis of rotation of said wheel with said first gripping shoulder being located radially inwardly of said chuck with respect to said second gripping shoulder, and wherein said chuck drive effects movement of said chuck jaws radially outwardly with respect to said wheel axis of rotation between a first radial position and a second radial position such that with said first gripping shoulders of said chuck jaws in register with said edge of said wheel defining said pilot hole, said chuck may accommodate wheels having said pilot holes ranging between said first diameter and an intermediate diameter, and wherein with said second gripping shoulders in register with said edge of said wheel defining said pilot hole, said chuck may accommodate wheels having said pilot holes ranging between about said intermediate diameter and said second diameter where the distance between said first diameter and said second diameter is greater than the distance said chuck drive may move said jaws between its first and second radial positions.

6. A wheel mount as set forth in claim 2 wherein said pilot hole in said wheel may range in diameter between a first diameter and a second diameter, wherein said jaws have a first gripping shoulder generally parallel to the axis of rotation of said wheel and a second gripping shoulder generally parallel to the axis of rotation of said wheel with said first gripping shoulder being located radially inwardly of said chuck with respect to said second gripping shoulder, and wherein said chuck drive effects movement of said jaws radially outwardly with respect to said wheel axis of rotation between a first radial position and a second radial position such that with said first gripping shoulders of said jaws in register with said edge of said wheel defining said pilot hole, said chuck may accommodate wheels having said holes ranging between said first diameter and a first intermediate diameter, and wherein with said second gripping shoulders in register with said edge of said wheel defining said pilot hole, said chuck may accommodate wheels having said pilot holes ranging between a second intermediate diameter and said second diameter where the distance between said first diameter and said second diameter is greater than the distance said chuck drive may move said jaws between its first and second radial positions, and where said second intermediate diameter is less than said first intermediate diameter such that there is some overlap in the range of diameters of said hole that said chuck can accommodate when said first or said second gripping shoulders are used.

7. A method of mounting a wheel assembly on a spindle shaft of a wheel balancer for rotation of said wheel assembly during balancing thereof, said wheel assembly having an axis of rotation, said wheel assembly having a pilot hole therein generally coaxial with respect to the axis of rotation of said wheel assembly, said spindle shaft having a stop thereon, wherein the method comprises the steps of:

securing a chuck within said wheel assembly pilot hole, said chuck having a plurality of jaws engageable with the edge of said wheel assembly defining said wheel assembly pilot hole, said chuck being substantially centered with respect to said wheel assembly pilot hole and being substantially coaxial with respect to said axis of rotation of said wheel assembly;

mounting said chuck with said wheel assembly secured thereto on said spindle shaft with the center of rotation of said wheel assembly being substantially coaxial with respect to said spindle shaft, and with said wheel assembly being in a fixed axial position along said spindle shaft, as determined by said stop; and fixedly securing a retainer with respect to said balancer shaft with said retainer fixedly holding said wheel assembly on said spindle shaft in fixed position with respect to said stop.

8. The method of claim 7 wherein said spindle shaft is threaded and wherein said retainer is threadably engageable with respect to said spindle shaft, and wherein said step of fixedly securing said retainer with respect to said spindle shaft comprises threadably installing said retainer on said spindle shaft after said chuck has been received on said spindle shaft such that said retainer engages at least a portion of said wheel and tire assembly, securing said wheel in fixed position with respect to said stop.

9. The method of claim 8 wherein said stop is engageable with said chuck, and with said retainer in engagement with said portion of said wheel said chuck is in engagement with said stop.

10. The method of claim 7 wherein said chuck is secured to said wheel hole before said chuck is mounted on said spindle shaft.

11. A method for concentric mounting of a wheel assembly having a pilot hole upon a spindle shaft of a wheel balancer for rotational balancing thereof, wherein the method comprises the steps of:

positioning a chuck in the pilot hole of said wheel assembly, said chuck having a plurality of movable jaws configured for gripping a surface of said wheel assembly and an axial bore;

moving said plurality of movable jaws into gripping engagement with said surface of said wheel assembly such that said axial bore of said chuck is concentric with an axis of rotation of said wheel assembly;

seating said wheel assembly upon said spindle shaft of said wheel balancer by fitting said axial bore of said chuck over said spindle shaft; and clamping said wheel assembly, together with said chuck, onto said spindle shaft to prevent movement relative thereto.

12. A wheel mount for a wheel balancer having a spindle shaft on which a wheel assembly may be mounted, said wheel assembly having an axis of rotation, said wheel assembly having a pilot hole at the center thereof substantially coaxial with the axis of rotation of said wheel assembly, said wheel having one or more edges defining said pilot hole, said wheel mount comprising:

a chuck having a plurality of jaws operable to grip the inner edge of said wheel assembly defining said pilot hole, so as to fixedly mount said chuck substantially coaxial with respect to said axis of rotation of said wheel assembly, said chuck having a center bore sized to receive said spindle shaft substantially coaxial with respect to said axis of rotation when said chuck is mounted on said wheel assembly.

\* \* \* \* \*